United States Patent [19]
Smiley et al.

[11] 3,803,424
[45] Apr. 9, 1974

[54] PIEZOELECTRIC PUMP SYSTEM

[75] Inventors: Parker C. Smiley, Oakland; Chester R. Mueller, Alamo, both of Calif.

[73] Assignee: Physics International Company, San Leandro, Calif.

[22] Filed: May 8, 1972

[21] Appl. No.: 251,081

[52] U.S. Cl.............. 307/149, 417/322, 417/2, 123/32 EA
[51] Int. Cl............................................ F04b 41/06
[58] Field of Search........... 417/322, 2; 123/32 EA; 307/38, 39, 40, 141, 141.4, 141.8, 149

[56] References Cited
UNITED STATES PATENTS
3,589,345  6/1971  Benson ........................ 123/32 EA
3,456,628  7/1969  Bassot et al. ................ 123/32 EA Primary Examiner—Herman Hohauser
Attorney, Agent, or Firm—Lindenberg, Freilich & Wasserman

[57] ABSTRACT

Piezoelectric pumps are operated in a manner so that the energy existing across the piezoelectric stack of one pump after a pumping operation is transferred to the piezoelectric stack of a following pump, and to that is then added sufficient energy to enable the following pump to perform a pump cycle. At the end of the pump operation of the following pump the energy remaining across its piezoelectric stack may then be applied across the piezoelectric stack of a following pump or across the piezoelectric stack of the first pump, to which additional further energy is applied to cause this pump to go into a pumping operation.

7 Claims, 3 Drawing Figures

PIEZOELECTRIC PUMP SYSTEM

BACKGROUND OF THE INVENTION

This invention relates to a system for operating piezoelectric pumps, and more particularly to improvements therein.

Piezoelectric pumps are known which comprise a stack of piezoelectric discs, each made for example of a barium titanate or lead zirconite titanate material, and wherein voltage is applied to these discs to enable them to expand or contract thereby moving a diaphragm. The moving diaphragm is used to pump fluid into and out of a housing. See the Williamson U.S. Pat. No. 3,194,162 for example.

One of the problems presented when piezoelectric material is used is that when a voltage is applied across a stack of piezoelectric discs, the discs move in response thereto, but after the pumping work is done, the discs acting as capacitors retain a charge which prevents them from returning to their original size. Thus if repetitive or high speed operation of the pump is required, it becomes necessary to get rid of this stored charge, if full pumping capacity is desired. One of the techniques for eliminating this charge is shown and described in a patent to Benson, U.S. Pat. No. 3,589,345, which essentially comprises shorting the piezoelectric stack or discharging it through an impedance in order to obtain a desired discharge characteristic.

Throwing away the energy stored by the piezoelectric stack of discs represents a waste. If this could be saved and reused, it is obvious that it would constitute an economic advantage.

OBJECTS AND SUMMARY OF THE INVENTION

An object of this invention is to provide a piezoelectric pump system whereby the residual energy left on the piezoelectric stack of the pump is used again.

Another object of this invention is the provision of a piezoelectric pumping system which uses the energy applied thereto more efficiently than heretofore.

Still another object of this invention is the provision of a novel and useful piezoelectric pumping system.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
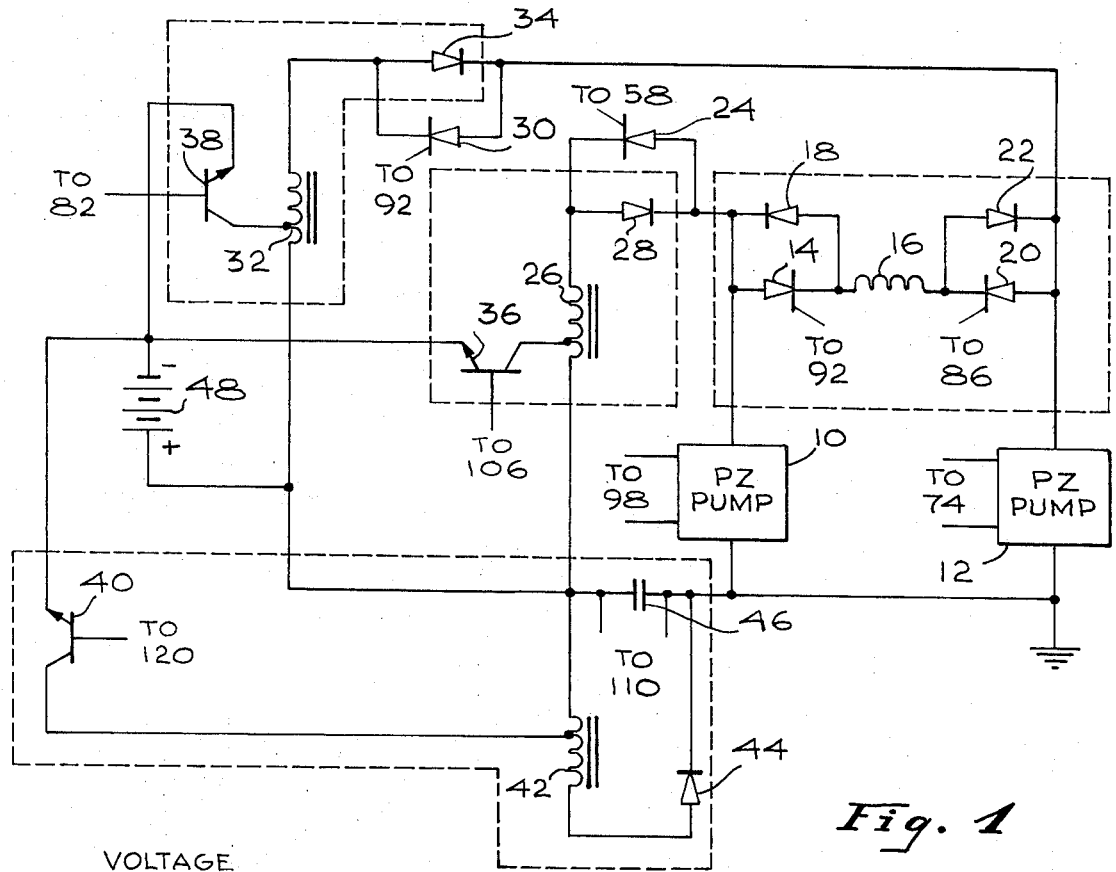
FIG. 1 is a schematic circuit diagram of a piezoelectric pumping system arrangement in accordance with this invention.

Referring now to FIG. 1, there may be seen an arrangement illustrative of a piezoelectric pumping system in accordance with this invention.

A first piezoelectric pump 10 and a second piezoelectric pump 12, which are alternately activated are employed. Piezoelectric pump 10 is connected through a silicon controlled rectifier 14 (SCR 14) to an inductance 16. A diode 18 is connected in parallel with the SCR 14 but its polarity is in reverse to that of the SCR 14.

Similarly, piezoelectric pump 12 is connected through a silicon controlled rectifier 20 (SCR 20) to the other end of the inductance 16. A diode 22 is connected in parallel with the SCR 20, but with its polarity reversed thereto.

Piezoelectric pump 10 is also connected to another silicon controlled rectifier 24 (SCR 24) whose other end is connected to a flyback transformer 26. A diode 28 is connected in parallel with the SCR 24, but with its polarity in reverse thereto.

Piezoelectric pump 12 is connected through a silicon controlled rectifier 30 (SCR 30) to another flyback transformer 32. A diode 34 is connected in parallel with the SCR 30, but with its polarity in reverse thereto. Flyback transformer 26 and a transistor 36 comprise one flyback oscillator. Flyback transformer 32 and a transistor 38 comprise a second flyback oscillator. These two flyback oscillators constitute "makeup" circuits, for making up any losses in voltage which occur across the respective piezoelectric pumps 10, 12 while they are going through a pump operation.

A third flyback oscillator is made up of a transistor 40 which is connected to a flyback transformer 42. One end of the flyback transformer 42 is connected to a diode 44 whose other end is connected to ground. A capacitor 46 is connected between the other end of the flyback transformer and ground. The flyback oscillator comprised of the transistor 40, the flyback transformer 42, the diode 44 and the capacitor 46 constitute a bias circuit for the piezoelectric pumps 10, 12 whereby they are biased to a predetermined voltage level. This is done to increase the volumetric displacement of the pumps.

The electrodes of the piezoelectric pumps opposite to those which are connected to the silicon controlled rectifier 14 and 20 are also connected to ground.

A source of operating potential 48 has one end connected to the emitters of transistors 40, 36 and 38. The ends of the flyback transformers which are closest to the collectors of the respective transistors 38, 36 and 40 are connected to the opposite side of the potential source 48.

A description of the operation of the arrangement shown in FIG. 1 is as follows. Assume first that piezoelectric pump 10 has had an operating potential applied thereto as a result of the operation of the flyback oscillator, comprised of transistor 36 and flyback transformer 26, which applies a voltage through the diode 28 across the piezoelectric pump 10. After the pump 10 has responded to this voltage, SCR 14 is rendered conductive, whereby the residual voltage across the piezoelectric stack of pump 10 can be discharged through the SCR 14, through the inductance 16, through the diode 22 to be applied across the piezoelectric pump 12.

Not all of the voltage across the piezoelectric pump 10 is dumped across piezoelectric pump 12. This is because of the impedance of the circuit and the piezoelectric stack across which the piezoelectric pump 10 is connected when SCR 14 is rendered conductive. In order to reduce the voltage thereacross still further, SCR 24 is next rendered conductive. The remaining voltage across piezoelectric stack of pump 10 can thereby be discharged through the flyback transformer 26. At this time, the bias circuit transistor 40 may be enabled to add a voltage to both piezoelectric pumps 10 and 12 through the respective flyback transformers 26, 32 and their respective diodes, 28, 34 to bring voltage across the piezoelectric stacks to a predetermined negative level.

At this time, transistor 38 is enabled, whereby the flyback oscillator, comprising transistor 38, and flyback transistor 32, are enabled to apply energy through diode 34 across the piezoelectric pump 12 to add to the value of the energy already present as a result of the transfer from piezoelectric pump 10. Piezoelectric pump 12 then goes through a pumping operation, at the end of which, SCR 20 is enabled whereby the energy remaining across piezoelectric pump 12 is transferred through inductor 16 and diode 18 to piezoelectric pump 10. Thereafter, SCR 30 is enabled, whereby the voltage remaining across the pump 12 can be discharged through flyback transistor transformer 32. Thereafter the bias circuit 40 is enabled to insure that the piezoelectirc pump stacks have the proper bias voltage applied thereacross.

From the foregoing description, it should be appreciated how the two piezoelectric pumps are alternately operated with energy remaining after an operation being transferred to the pump which is no operated to reduce or minimize the amount of energy required to make that pump operation. From the foregoing those skilled in the art will appreciate how it is possible to operate a sequence of pumps, transferring energy from one to the other, in the manner explained.

Figure 2:
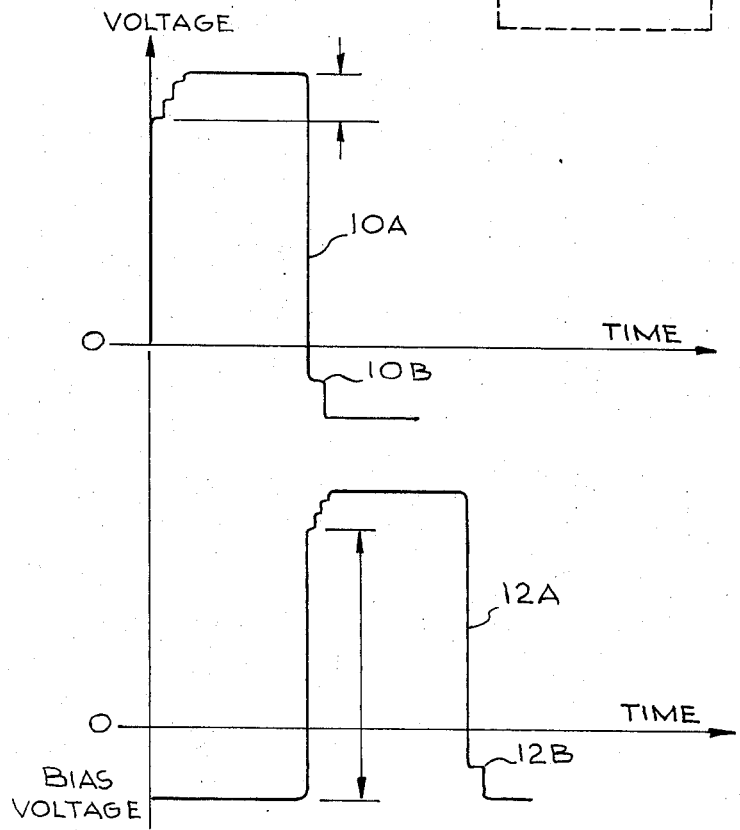
FIG. 2 is a voltage waveform diagram, shown to assist in an understanding of this invention.

FIG. 2 is a voltage waveform diagram shown to assist in an understanding of the operation of this invention. The waveform 10a is a waveform of the voltage which exists across the piezoelectric stack of pump 10. Similarly, the waveform 12a represents waveform of the voltage which will next exist across the piezoelectric stack of pump 12. Waveform 10a is charged up to a predetermined value above the voltage which has been dumped thereinto from the piezoelectric stack of pump 12. It will be seen from the waveform that the amplitude of this increase in voltage, which occurs on the front end of the waveform is not as large as the larger voltage transferred thereto from the piezoelectric stack of the other pump. The trailing edge of waveform occurs when the energy from the stack is now transferred to the opposite pump stack. The further negative drop off at point 10b of the waveform 10a occurs as a result of negative bias which is applied by the biasing circuit.

The waveform for the piezoelectric pump 12 is the same as the waveform for the piezoelectric pump 10 except that it commences at a time when the trailing edge of the waveform 10a occurs.

Figure 3:
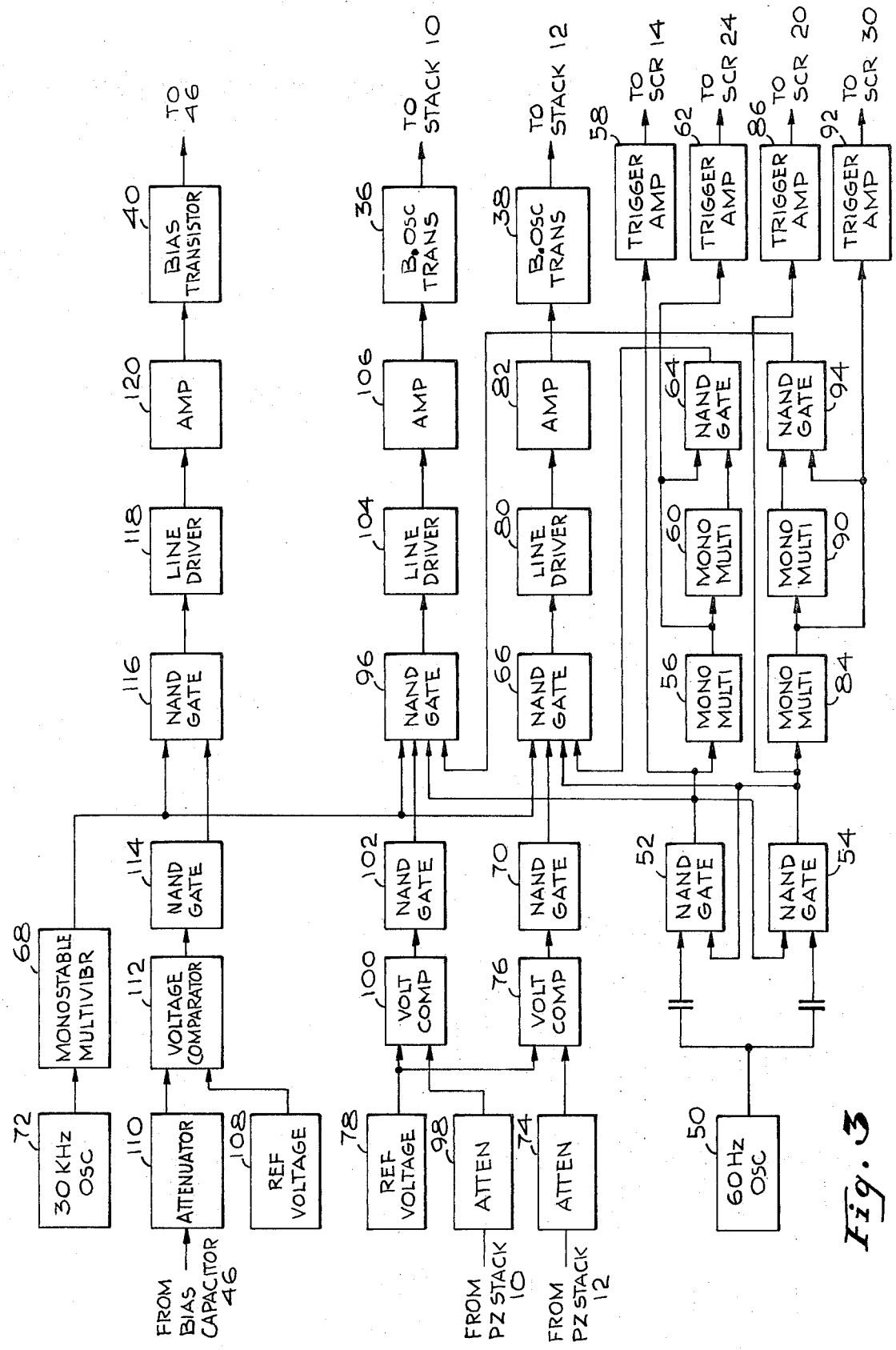
FIG. 3 is a block diagram of the electronic circuitry required for operating the piezoelectric pumping system in accordance with this invention.

FIG. 3 is a block schematic diagram of the circuit arrangement required for providing the timing for the operation of the system described in connection with FIG. 1. A 60 hertz oscillator 50 applies its output to two Nand gates respectively 52, 54. The output of Nand gate 52 is applied as a second enabling input to Nand gate 54, and the output of Nand gate 54 is applied as a second enabling input to Nand gate 52. Accordingly, the respective Nand gate 52 and 54 will be enabled alternately,. When Nand gate 52 is enabled, its output is applied to a monostable multivibrator circuit 56 and also to a trigger amplifier circuit 58. Trigger amplifier circuit 58 enables SCR 14 in FIG. 1 whereby piezoelectric pump 10 can transfer most of its piezoelectric stack residual energy to the piezoelectric stack at pump 12. After a suitable delay, the output of the monostable multivibrator 56 is applied to a second monostable multivibrator 60 to a Nand gate 64, and also to energize a trigger amplifier 62. Trigger amplifier 62 enables SCR 24, whereby piezoelectric pump 10 can dump its remaining residual energy through flyback transformer 26.

The outputs of monostable multivibrators respectively 56 and 60 after a delay period required for operating monostable multivibrator 60, enable Nand gate 64 which then applies its output to a succeeding Nand gate 66. Other required inputs to enable Nand gate 66 are the the output of the Nand gate 54, (already present) the output of a monostable multivibrator 68, and the output of a Nand gate 70.

Monostable multivibrator 68 is driven in response to the output of a 30 kilohertz oscillator 72. An attenuator 74, which is connected across the piezoelectric stack of pump 12, applies some of the voltage thereacross to a voltage comparator 76. A predetermined reference voltage from a source 78 is applied as a second input to the voltage comparator 76. When the stack voltage is below the predetermined reference voltage, the voltage comparator 76 applies an output to the Nand gate 70 which inverts it and applies it to the Nand gate 66.

When all inputs are present at Nand gate 66, it applies an output to a line driver circuit 80, whose output drives an amplifier 82. The output of the amplifier 82 drives blocking oscillator 38 in FIG. 1, whereby the piezoelectric stack of pump 12 is charged up to a value, as determined by the reference voltage 78.

At this time, monostable multivibrators 56 and 60 are reset, turning off SCRs 14 and 24 and Nand gate 66, and Nand gate 54 is enabled. It applies its output to a monostable multivibrator 84. Its output is also applied to a trigger amplifier 86, which enables SCR 20 whereby the piezoelectric stack of pump 12 can dump residual voltage into the piezoelectric stack of pump 10.

After a predetermined delay, monostable multivibrator 84 provides an output to a trigger amplifier circuit 92, and to a second monostable multivibrator 90. Trigger amplifier 92 enables SCR 30 to dump the remaining voltage across the piezoelectric stack of pump 12. The outputs of monostable multivibrators 84 and 90, which are now applied to the input of Nand gate 94 cause Nand gate 94 to apply an output to one input of a Nand gate 96.

Nand gate 96, like Nand gate 66 receives a plurality of inputs, the simultaneous presence of which will enable operation of the blocking oscillator which charges up the piezoelectric stack pump 10. Thus, the required inputs to Nand gate 96 besides the one received from the Nand gate 94 are an output from the monostable multivibrator 68 which occurs at the rate 30 kilohertz. Attenuator 98 senses the voltage across the piezoelectric stack of pump 10 and applies it to a voltage comparator 100. The other input to the voltage comparator is the reference voltage 78. The output of the voltage comparator is applied to the Nand gate 102 which acts as an inverter and in the absence of any signals from the voltage comparator provides a signal to the Nand gate 96. The third input to Nand gate 96 is an output from Nand gate 52, which occurs at a 30 hertz rate.

Nand gate 96, now enabled, enables a line driver 104 to drive an amplifier 106. The output of the amplifier 106 drives blocking oscillator transistor 36, whereby piezoelectric stack 10 is charged to its full value.

The bias circuit operates at a 30 kilohertz rate and whenever the bias voltage across the bias capacitor 46 drops below a value established by a reference voltage source 108, an attenuator 110 measures the voltage across the bias capacitor 46 and applies it to a voltage comparator 112. The other input to the voltage comparator is a reference voltage from a source 108. The voltage comparator output is connected to a Nand gate 114, which acts as an inverter. In the absence of an input, it applies an output to a Nand gate 116 whose second required input is the output of monostable multivibrator 68. The output of the Nand gate 116 is applied to a line driver 118 which drives an amplifier 120. Amplifier 120 drives transistor 40 whereby a bias voltage is applied to capacitor 46 until the voltage derived therefrom equals the reference voltage obtained from the source 108.

In summarization of the foregoing description, the monostable multivibrators 56, 60 and 84, 90 serve the function of providing the proper delay or timing required to operate the two piezoelectric pumps alternately so that one of them charges up, then dumps the surplus charge into the adjacent piezoelectric pump, then is fully discharged. Thereafter, it is properly biased preparatory to receiving charge from the other piezoelectric pump. Clocking signals are provided by the oscillator 72 and 50.

While the structure thus far described shows how to alternately operate piezoelectric pumps, one skilled in the art, with the foregoing description, will understand how to operate more than two piezoelectric pumps in a sequence where rapid operation is desired or required. This may occur for example when the piezoelectric pumps are used as fuel injectors in an internal combustion engine.

There has accordingly been described and shown herein a novel, useful and efficient system for operating piezoelectric pumps.

What is claimed is:

1. A system for efficiently operating a plurality of pumps, each of which has piezoelectric actuating material therein comprising:

inoperative first transfer switch means for connecting the piezoelectric material in one of said pumps across the piezoelectric material of a second of said pumps when rendered operative;

means for rendering said first transfer switch means operative to charge up the piezoelectric material of said second pump from the voltage across the piezoelectric material of said first pump; and means for applying additional voltage to the piezoelectric material of said second pump to establish a desired pumping value of voltage across said second piezoelectric material of said second pump.

2. A pumping system as recited in claim 1 wherein there is included a second transfer switch means for connecting the piezoelectric material of said second pump across the piezoelectric material of said first pump when operative, to transfer the voltage existing across the piezoelectric material of said second pump to the piezoelectric material of said first pump:

means for rendering said second transfer switch means operative to charge up the piezoelectric material of said one of said pumps from the voltage across the piezoelectric material of said second pump; and means for thereafter increasing the voltage across the piezoelectric material of said second pump to a desired pumping amplitude.

3. A pumping system as recited in claim 2 wherein there is included, for said first pump, a shorting switch means operative after said first transfer switch means for substantially shorting said piezoelectric material of said first pump to remove any remaining voltage;

a second shorting switch means connected across the piezoelectric material of said second pump for removing, when operative any residual voltage existing across the piezoelectric material of said second pump after the operation of its transfer switch means; and sequencing means for ording the proper sequence and operation of said first and second transfer switch means, said first and second shorting switch means, and said means for applying additional voltage to the piezoelectric material of said first and second pumps.

4. A pumping system as recited in claim 3 wherein there is included a means for applying a bias voltage to the piezoelectric material of said first and second pumps after the operation of said first and second shorting switch means.

5. A pumping system comprising a plurality of pumps each having piezoelectric pumping material therein:

transfer switch means for transferring the energy left after a pumping operation from the piezoelectric material of one of said plurality of pumps to the piezoelectric material of a succeeding one of said plurality of pumps to be operated;

means for boosting the energy transferred to the piezoelectric material of said succeeding pump to a predetermined value to enable said succeeding pump to operate; and means for transferring the energy remaining on said piezoelectric material of said succeeding pump after it is operated to the piezoelectric material of a next one of said plurality of said pumps to be operated.

6. A piezoelectric pumping system comprising first and second piezoelectric pumps each including piezoelectric material:

a first transfer switch means including means, when operative, for enabling the transfer of voltage of piezoelectric material of said first piezoelectric pump to the piezoelectric material of said second piezoelectric pump;

a second transfer switch means including means, when operative, for transferring the voltage from the piezoelectric material of said second piezoelectric pump to the piezoelectric material of said first piezoelectric pump;

first oscillator means for boosting to a predetermined value the voltage on the piezoelectric material of said first piezoelectric pump after it has received voltage from the piezoelectric material of said second piezoelectric pump;

second oscillator means for boosting the voltage, when operative, across the piezoelectric material of said second piezoelectric pump to a predetermined value after it has received voltage from said piezoelectric material of said first piezoelectric pump;

means for biasing, the piezoelectric material of said first and second piezoelectric pumps; and timing means for rendering operative in a predetermined sequence, the first and second transfer switch means, and the first and second oscillator means whereby the piezoelectric material of each pump is connected across the piezoelectric material of the other pump after a pumping operation and voltage is added across the piezoelectric material of each pump after a voltage is received from the piezoelectric material of the other pump.

7. A piezoelectric pumping system as recited in claim 6 wherein there is included a first shorting switch means for discharging, when operative, any remaining voltage existing across the piezoelectric material of said first piezoelectric pump after the operation of said first transfer switch means; and a second shorting switch means for discharging when operative, any existing voltage across the piezoelectric material of said second piezoelectric pump after the operation of said second transfer switch means; and said timing means including means for operating said first or said second shorting switch means after the operation of said first or said second transfer switch means.

* * * * *